United States Patent [19]
Zopf

[11] 4,369,950
[45] Jan. 25, 1983

[54] TURNTABLE SUPPORT

[75] Inventor: David E. Zopf, Lansing, Mich.

[73] Assignee: Complete Business Services Corp., Lansing, Mich.

[21] Appl. No.: 153,453

[22] Filed: May 27, 1980

[51] Int. Cl.$^3$ .......................................... F16M 13/00
[52] U.S. Cl. .................................................. 248/632
[58] Field of Search ............... 248/188.1, 184.4, 174, 248/650, 632, 634, 346; 297/461, DIG. 1; 179/1 E, 146 E, 180; 181/151, 146, DIG. 1

[56] References Cited

U.S. PATENT DOCUMENTS

| | | | |
|---|---|---|---|
| 1,419,293 | 6/1922 | Myers | 248/632 |
| 1,451,999 | 4/1923 | Perry | 248/188.4 |
| 3,193,236 | 7/1965 | Thorn | 248/632 |
| 3,759,471 | 9/1973 | Sholtes | 248/188.4 X |
| 3,788,581 | 1/1974 | Rutzick | 248/678 |

FOREIGN PATENT DOCUMENTS 960580  6/1964  United Kingdom ............... 248/634

Primary Examiner—William H. Schultz
Assistant Examiner—Ramon O. Ramirez
Attorney, Agent, or Firm—Price, Heneveld, Huizenga & Cooper

[57] ABSTRACT

A turntable support for vibration isolating, elevating and leveling a phonograph turntable in relation to a resting surface is provided comprising a roughly rectangular, rigid base structure for elevating the turntable. A continuous layer of self-skinning, semi-rigid urethane foam completely encapsulates the rectangular base structure for vibration isolating the turntable. A turntable engaging surface is disposed atop the support and a plurality of resting surface engaging feet are provided, each resting surface engaging foot including means for selectively adjusting the length of the feet and thus leveling the turntable.

4 Claims, 4 Drawing Figures

TURNTABLE SUPPORT

BACKGROUND OF THE INVENTION

The present invention relates generally to turntable supports, and more particularly to an inexpensive turntable support for elevating and vibration isolating a turntable from the surface upon which it rests.

It is known that when a turntable is mounted in close proximity to a loudspeaker, a vibration isolating support is required to prevent acoustic feedback from the speaker. Acoustical feedback is principally a result of acoustical energy, absorbed by the surface upon which the turntable is mounted, being transmitted to the needle through the chassis and tone arm of the turntable. When volumes are high, acoustical feedback can be a problem even when the speakers are remotely mounted with respect to the turntable. Prior art arrangements that have been employed to alleviate this problem include pneumatic or fluid filled pillows upon which the turntable is placed; mounting the turntable on a spring-loaded shelf and mounting the turntable on a felt pad or the like. Problems with these prior art techniques for vibration isolating a turntable are related to their cost, complexity, poor aesthetic qualities, poor vibration dampening characteristics and the inability to accurately level the turntable when one of these devices is used.

SUMMARY OF THE INVENTION

According to the present invention, these and other problems in the prior art are solved with a less complex, and more aesthetically pleasing turntable support for vibration isolating, elevating and leveling a turntable in relation to the surface upon which it rests. The turntable support comprises a roughly rectangular, rigid base structure for elevating the turntable. The base structure is provided with a continuous layer of self-skinning, semi-rigid urethane foam which fully encapsulates the rectangular base structure for vibration isolating a turntable. The self-skinning urethane foam can be formulated and packed to have superior vibration dampening characteristics, it provides an aesthetically pleasing surface that does not easily soil and it adds strength and stability to the overall structure. The support includes a turntable engaging surface disposed atop the support, and a plurality of resting surface engaging feet disposed on the bottom of the support. Each of the resting surface engaging feet is provided with means for selectively adjusting the length of the feet to effectively level the turntable. The turntable engaging surface defined by the rigid base structure and the continuous layer of self-skinning, semi-rigid urethane foam provides a stable surface upon which the turntable is located. Once the turntable is located on the support, it is effectively vibration isolated from its environment by layers of self-skinning, semi-rigid urethane foam on the top and bottom of the rigid base. Leveling of the turntable is thereafter readily achieved to obtain optimum tracking accuracy for the turntable.

DESCRIPTION OF THE PREFERRED EMBODIMENTS

Figure 1:
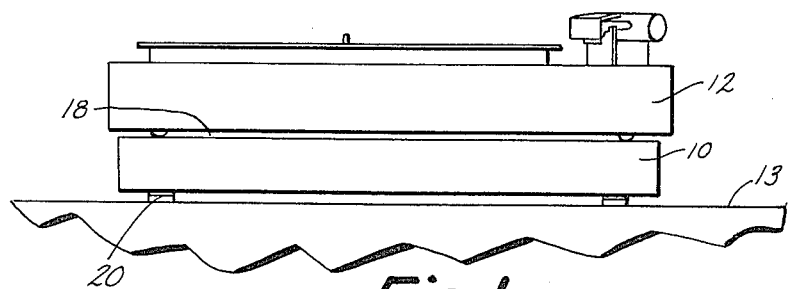
FIG. 1 is an elevational view of the turntable support of the present invention with a turntable disposed theron.
Figure 3:
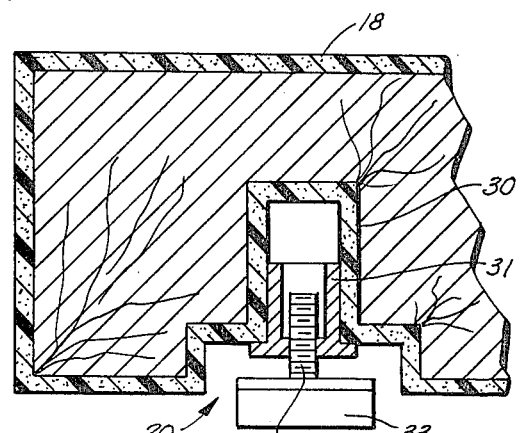
FIG. 3 is a partial, sectional view of the turntable support of the present invention.
Figure 2:
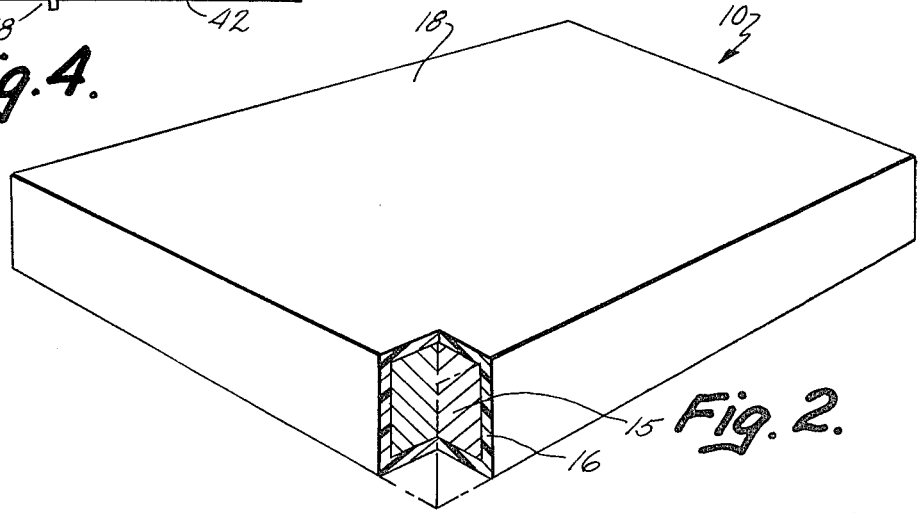
FIG. 2 is a perspective view of the turntable support of the present invention.

Referring now to FIG. 1, a turntable support is illustrated at 10 for vibration isolating, elevating and leveling a turntable 12 with respect to a resting surface 13. With reference now also to FIG. 2, the turntable support 10 comprises a roughly rectangular, rigid base structure 15 which elevates the turntable and acts as a supporting matrix for a continuous layer of self-skinning, semi-rigid urethane foam 16. The urethane foam 16 is molded onto the rigid base 16 in a manner that fully encapsulates the base 15 in the foam 16 to effectively vibration isolate the turntable 12 from the surface 13. It is also clear that the effect of the foam 16 is also to dampen acoustical energy that may be absorbed directly by the chassis of the turntable 12 from the surrounding air. This type of foam provides a smooth fairly rigid molded surface but is flexible enough to dampen vibration received from the resting surface or the turntable. The foam can be formulated and packed to create superior vibration isolating characteristics. The top 18 of the support 10 provides a turntable engaging surface and as best illustrated in FIGS. 1 and 3, the support further includes a plurality of resting surface engaging feet 20. The resting surface engaging feet 20 include means for selectively adjusting the length of the feet and effectively leveling the turntable to assure accurate tracking of the tone arm and needle of the turntable.

With further reference to FIG. 3, it is illustrated that each of the resting surface engaging feet 20 includes means for selectively adjusting the length of the feet and thus leveling the turntable, comprising a foam coated aperture 30 have an insert 31 force fitted therein. The inserts 31 threadably receive a headed male member 32 having a rubber covered resting surface engaging pad or surface 33.

Figure 4:
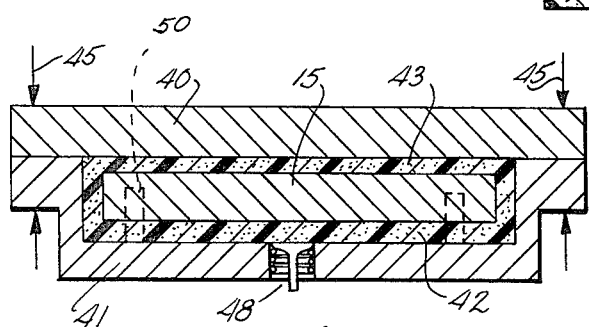
FIG. 4 is a sectional view of a molding apparatus used to manufacture the turntable support of the present invention.

With reference now to FIG. 4, it is illustrated that the rigid, rectangular base structure 15 of the turntable support of the present invention is encapsulated in self-skinning, urethane foam by coating the first and second mold members 40 and 41 with a suitable release agent; dispensing a measured amount of foam at 42 in the second mold member 41; placing the rigid base 15 thereon; placing a second measured amount of foam 43 atop the base member 15; and then clamping the mold halves 40 and 41 together as indicated by the arrows 45. After the foam at 42 and 43 expands to fill the cavity surrounding the rigid base structure 15, the mold may be unclamped and the turntable support removed therefrom. To facilitate ejection of the turntable support from the mold members, one or more pop-up type valves, such as the one illustrated at 48 may be provided to assist in ejecting the finished part with compressed air. Thereafter, any remaining release agent may be washed from the surface of the turntable support and the support may be painted with a water base lacquer. The rigid base structure 15 is predrilled and the second mold member 41 includes a plurality of cylindrical projections 50 for insertion into the apertures predrilled in the rigid base structure 15 to form the foam coated apertures 30 which receive the leveling feet 20. The cylindrical projections 50 are also useful to properly locate the base 15 within the mold cavity defined by the mold halves 40 and 41.

Although other vibration isolating material may be used, self-skinning urethane foam is preferred since it provides a surface having a pleasing aesthetic appearance, it does not easily soil and it can be formulated and packed to have specific vibration dampening qualities. In the preferred embodiment, a urethane foam having a free rise density of 5 lbs per cubic foot is used and the foam is moderately packed in the mold cavity to achieve the best vibration dampening characteristics. Preferably, the base structure 15 is made from a solid or built-up slab of particle board, however, other materials such as wood and plywood may also be used. The support is relatively inexpensive and may be used almost anywhere a turntable is normally placed to effectively vibration isolate and level the turntable.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows:

1. A turntable support for vibration isolating, elevating and leveling a turntable in relation to a resting surface comprising:

a roughly rectangular rigid base structure for elevating a turntable, said base having a top surface, sides and bottom edges;

a continuous layer of self-skinning, semi-rigid urethane foam molded onto and fully encapsulating said rectangular base structure for vibration isolating a turntable;

a turntable engaging surface disposed on said support;

a plurality of resting surface engaging feet, said feet each including means for selectively adjusting the length of said feet for leveling a turntable; and said foam layer extending continuously over the entire top surface of said base structure, downwardly over the exterior of the sides of said base structure, inwardly over the bottom edges of said base structure and between said base structure and said feet, said turntable engaging surface being formed by said foam layer, said turntable engaging surface being substantially imperforate and formed by said foam overlying the entire top surface of said base structure, whereby vibration from a turntable or from a surface upon which the turntable support is positioned is effectively dampened by a foam layer engaging both the turntable and the feet of the turntable support while extending continuous therebetween.

2. The turntable support of claim 1 wherein said base further includes an aperture for each of said plurality of feet.

3. The turntable support of claim 2 wherein each aperture is coated with a layer of said foam.

4. The turntable support of claim 3 wherein each of said plurality of feet and said means for selectively adjusting the length of said feet comprises an insert force fitted into each of said apertures, said insert threadably receiving a male member having a rubber covered resting surface engaging surface.

* * * * *